United States Patent
Hamabe

Patent Number: 5,603,082
Date of Patent: Feb. 11, 1997

[54] CHANNEL ALLOCATION SYSTEM FOR COMMUNICATION SYSTEMS AND AN APPARATUS THEREOF

[75] Inventor: Kojiro Hamabe, Tokyo, Japan

[73] Assignee: NEC Corporation, Japan

[21] Appl. No.: 364,082

[22] Filed: Dec. 27, 1994

[30] Foreign Application Priority Data

Dec. 27, 1993 [JP] Japan .................... 5-330209

[51] Int. Cl.$^6$ .................................. H04M 11/00
[52] U.S. Cl. ............. 455/33.1; 455/33.3; 455/56.1; 455/62; 455/63; 379/59
[58] Field of Search .................. 455/33.1, 33.3, 455/34.1, 56.1, 54.1, 54.2, 62, 63, 33.2; 379/59

[56] References Cited

U.S. PATENT DOCUMENTS

| | | | |
|---|---|---|---|
| 5,038,399 | 8/1991 | Bruckert | 455/62 |
| 5,448,750 | 9/1995 | Eriksson et al. | 455/33.1 |
| 5,475,864 | 12/1995 | Hamabe | 455/62 |
| 5,491,833 | 2/1996 | Hamabe | 455/33.3 |

OTHER PUBLICATIONS

Andersson et al, "Adaptive Channel Allocation in a TIA IS–54 System", 1992, pp. 778–781.

Bhargawa et al., "Performance of Dynamic Channel Assignment Techniques in a Cellular Environment", 1992, pp. 340–343.

*Primary Examiner*—Andrew Faile
*Assistant Examiner*—Doris To
*Attorney, Agent, or Firm*—Ostrolenk, Faber, Gerb & Soffen, LLP

[57] ABSTRACT

In this invention, base stations established in service areas use sector antennas to cover a multiplicity of sector cells. When a communication request arises between a wireless terminal and a sector cell within the sector cell, the base station determines the arrival directions of interference waves on all channels and the arrival direction of the desired waves from the wireless terminal, selects channel in order for which the difference between arrival directions of interference waves and desired waves are closest to 180° and allocates the first channel to satisfy allocation conditions.

13 Claims, 5 Drawing Sheets

CHANNEL ALLOCATION SYSTEM FOR COMMUNICATION SYSTEMS AND AN APPARATUS THEREOF

BACKGROUND OF THE INVENTION

The present invention relates to channel allocation systems for cellular mobile communications systems covering several zones by using base stations for each zone, in particular, channel allocation systems for mobile communications systems that divide the above-mentioned zones into fan-shaped cell (sector cells) for each directional gain of sector antennas (antennas having different horizontal plane directivity), by contacting these sector antennas to each of the above-mentioned base stations.

Cellular mobile communications system such as car telephone systems repeatedly use the same wireless channels (channels) between zones that do not interfere with one another. Configuration of the above-mentioned zones in these mobile communications systems can be either omni zone configuration or sector zone configuration. In omni zone configuration, one antenna with no horizontal plane directivity (omni antenna) is installed at each base station to cover one zone centered around the base station supported by this omni antenna. With sector zone configuration, one base station is equipped with a number of sector antennas having directivity within fan-shaped horizontal planes and each of the above-mentioned sector antennas covers a fan-shaped area (sector cell) corresponding to directional gain of that antenna. In sector zone configuration, because there is little interference within the same channel because of the effect of the limited directivity of the sector antennas, repeat distance of the same channel is shorter than in omni zone configuration, and therefore there is a high rate of frequency (channel) use efficiency. The above-mentioned two methods for configuration of zones are covered in detail in the reference (Yoshikawa, Nomura, Watanabe, Nagatsu "Configuration methods for wireless zones for car telephones" Kenkyu jitsuyoka hokoku Vol. 23 No. 8, 1974). The above-mentioned mobile communications system also includes a number of fixed or mobile wireless terminals in the above-mentioned zones. These wireless terminals communicate with different wireless terminals or public communications nets via wireless channels (communication channels) between the wireless terminals and base stations of the zones to which they belong.

Allocation systems for communications channels of the above-mentioned mobile communications systems are classified as fixed channel allocation systems and dynamic channel allocation systems. Fixed channel allocation systems allocate channels for communications beforehand in a fixed way for each zone, taking into account mutual interference conditions between zones. The dynamic channel allocation system does not allocate channels in a fixed manner to each zone. When the base station sequentially selects a channel from among all channels for each communication request and certain allocation preconditions (communication quality) are satisfied at a channel, for example, the ratio between received power (desired wave power) of the signal from the other end of the communication link (one wireless terminal) and interference wave power (hereafter, this ratio is abbreviated as "CIR") exceeds certain threshold values for both uplink (transmission from wireless terminal, with base station the reception circuit) and downlink (transmission from base station, with the wireless terminal the reception circuit), the channel that satisfies those conditions is allocated as the communication channel. This dynamic channel allocation system makes effective use of channels through the collective use of all channels by all base stations. Because with this allocation system, the same channel can be re-used as long as the CIR threshold value is satisfied, the same channels can be re-used within shorter distances than with the fixed channel allocation system, making even more efficient use of channels. Thus, with the dynamic channel allocation system higher frequency (channel) usage efficiency than with the fixed channel allocation system is obtainable.

One conceivable way of obtaining high-frequency (channel) usage efficiency is to use a combination of sector cell zone configuration and dynamic channel allocation. As an example of a sector cell zone configured dynamic channel allocation system, there is an allocation system that prioritizes the same channels for sector cells in the same direction (Japanese Patent Laid-Open No. 081101 (1993)). Under actual propagation environments, at the downlink reception level, where the base station transmits and wireless terminals receive, there are locational variations due to interference by natural terrain or objects in the vicinity of the wireless terminals. It is known that, because this locational variation is strongly affected by topography and geographical features present in the arrival direction of the radio waves, the less of a difference there is between the arrival directions of the desired waves and interference waves, the higher the correlation of locational variation between the two. The reference (V. Graziano, "Propagation Correlations at 900 MHz", IEEE Trans. Veh. Technol. VT-27, No. 4, November 1978) covers this. Therefore, since when there is a small difference between arrival directions of desired and interference waves in downlinks, because the strong correlation between the two in regard to locational variation means that when wireless terminals move, there is a high probability that desired waves will become stronger, together with interference waves, and therefore, if there is a constant CIR threshold value for channel allocation, CIR for in-use downlinks becomes smaller, and the possibility of signal deterioration through interference is small. This system uses the above-mentioned allocation system in which sector cells in the same channel are prioritized.

However, just as the difference in arrival directions between desired and interference waves becomes smaller in the downlink in the system of allocation by the prioritization of sector cells in the same channel, there is a problem in that when channels are allocated, the effect of the correlation of locational variation between desired and interference waves cannot be adequately obtained. Below, an example of this is explained, referring to the conceptual diagram in FIG. 5.

The mobile communications system in FIG. 5 uses a sector zone configuration. A base station (BS) 11 is established in the first zone and base stations 12 and 13 are established in the second and third zones, respectively. This mobile communications system has many other zones as well, but, as explanations of these zones are unnecessary, they are not included in the figures. At the base station 11, a sector antennas 31 (31a, 31b, 31c, 31d, 31e and 31f), whose horizontal plane directivity has a 60° half-value width angle (the angular width that encompasses the point where directional gain is just 3 dB smaller than directional gain in the central direction, where direction of maximum emission intensity is the center) are established. The sector antennas 31a, 31b, 31c, 31d, 31e and 31f are positioned in correspondence with the above-mentioned horizontal plane directivity to cover 6 equal sector cells 41 (41a, 41b, 41c, 41d, 41e and 41f), respectively around the base station 11. In the same way, the 6 sector antennas each of antennas 32 and 33 of the base stations 12 and 13 cover sector cells 42 and 43, respectively. A wireless terminal 21 is located in sector cell 41f, wireless terminal 22 is located in the sector cell 42f and the wireless terminal 23 is located in the sector cell 43a.

Let us now consider the case in which the base station 12 is currently using channel CH2 to communicate with the wireless terminal 22, the base station 13 is using channel CH3 to communicate with the wireless terminal 23 and the base station 11 allocates a new channel to the wireless terminal 21.

First, concerning the uplink, because neither wireless terminals 22 nor 23 are within the directivity direction of sector antenna 31f, which covers the wireless terminal 21, bother channels CH2 and CH3 satisfy CIR threshold value. Concerning downlink, the wireless terminal 21 is neither within the directivity direction of sector antenna 32f which covers the wireless terminal 22 nor within directivity direction of the sector antenna 33a which covers the wireless terminal 23, so CIR threshold value is satisfied and allocation is possible. However, although half-value width angle of the sector antennas is 60°, because radio waves of a certain degree of intensity are emitted in their environs, when channel CH2 is used in the downlink of the wireless terminal 21, interference waves from the base station 12 become a problem, as do interference waves from the base station 13 when channel CH3 is used. Therefore, in order to lessen the tendency of deterioration due to interference when wireless terminals are moved, it is desirable that channel selection for downlinks be conducted so as to minimize the differences between arrival directions of desired waves and interference waves.

At this time, there is a strong possibility that the channel allocation system by giving priority to the same channel for sector cells of the same direction will allocate channel CH2 which is used by the sector antenna 32f, whose directivity direction is the same as that of the sector antenna covers the terminal 21. In this case, channel CH3 is the channel in which difference between the arrival direction of desired wave and that of interference wave in the wireless terminal 21 downlink becomes smaller, but in the wireless terminal 21 the allocated channel is channel CH2, for which the difference between the arrival directions of desired wave and interference wave becomes greater.

The prior channel allocation system that the sector cells of the same direction are preferentially allocated involves a problem of not adequately obtaining the above-mentioned benefit in downlinks from the correlations of locational variation of desired waves to locational variation of interference waves.

SUMMARY OF THE INVENTION

It is an object of the present invention to solve the above-mentioned problem with the prior channel allocation system, and to provide a channel allocation system for mobile communications systems in which deterioration due to interference during calls does not easily occur.

The object of the present invention is achieved by a channel allocation system for communication systems, by which a proper communication channel between a wireless terminal and a base station is allocated when a communication request has arisen between said wireless terminal and said base station to which said wireless terminal belongs, where the channel allocation system for communication systems comprising: a step of measuring a received level of a desired wave from the wireless terminal in each sector cell of the base station and calculating an arrival direction of the desired wave, in the base station; a step of measuring a received level of an interference wave from a channel that is used by other base stations and other wireless terminals in each sector cell of the base station and calculating an arrival direction of the interference wave, in the base station; and a step of allocating a communication channel of which angle difference in a horizontal plane between the arrival direction of the desired wave and the arrival direction of the interference wave is closest to 180° for communication between the wireless terminal and the base station.

Using the above techniques, the present invention makes possible reduction of the probability of reduced quality during communication in mobile communications systems using the sector zone configuration and dynamic allocation system by prioritized allocation of channels for which the differences in angles of arrival directions of desired and interference waves in downlinks are small, thereby increasing correlations of reception levels of desired waves and interference waves on downlinks to locational variation as wireless terminals are moved.

This and other objects, features and advantages of the present invention will become more apparent upon a reading of the following detailed description and drawings.

DESCRIPTION OF THE PREFERRED EMBODIMENTS

Following is an explanation of the present invention with reference to the figures.

Figure 1:
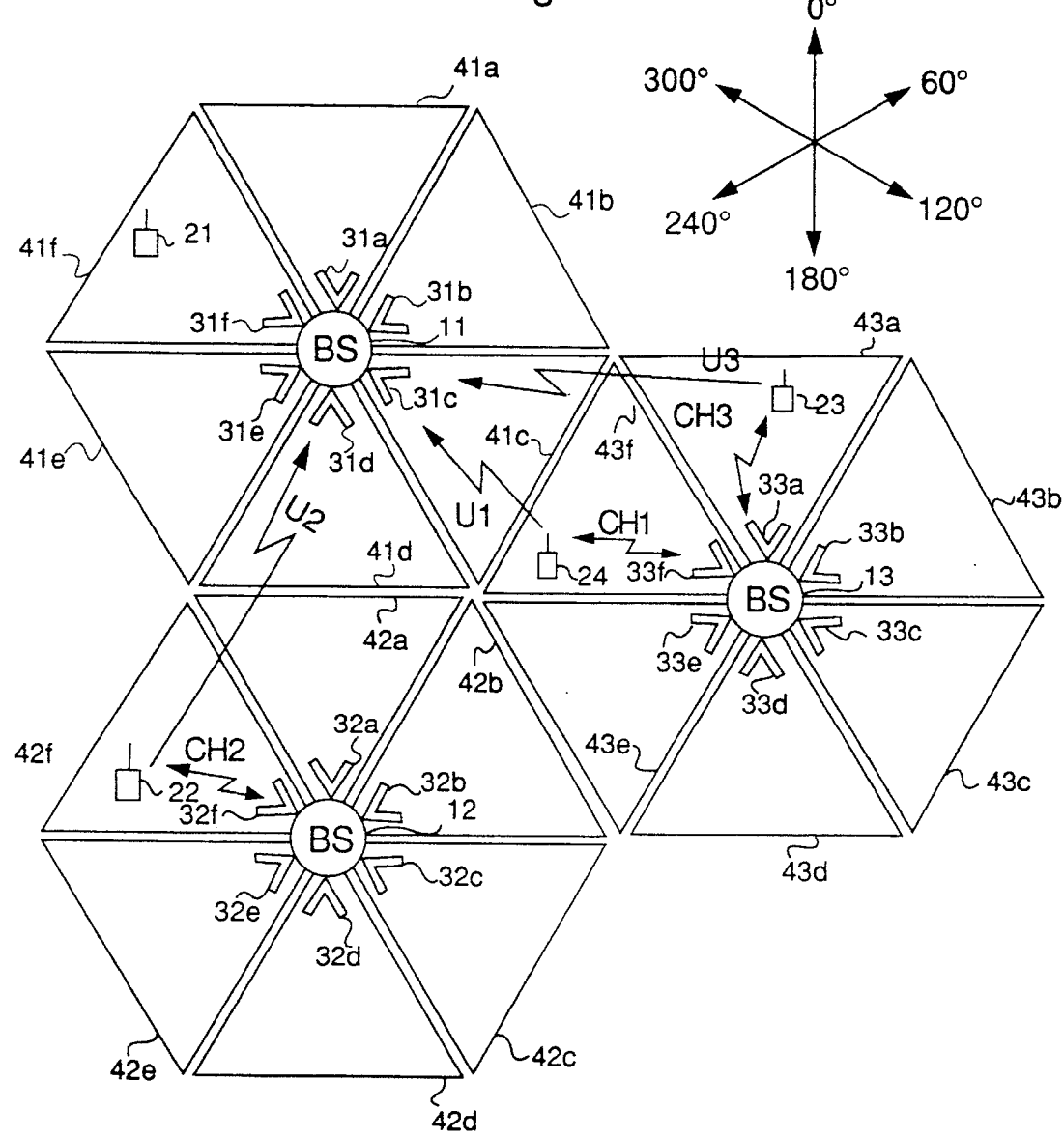
FIG. 1 is a conceptual system diagram of the first embodiment of the present invention.

FIG. 1 is a conceptual system diagram of an embodiment of the present invention. The first embodiment is configured by the system shown in FIG. 1.

This cellular mobile communications system provides 3 zones, held respectively by base stations (BS) 11, 12 and 13. The 6 sector antennas 31 (31a, 31b, 31c, 31d, 31e and 31f), each having a horizontal plane directivity whose half-value width angle is 60° are connected to the input terminals of the reception section of the base station 11. These sector antennas 31a, 31b, 31c, 31d, 31e and 31f cover sector cells 41 (41a, 41b, 41c, 41d, 41e and 41f), respectively, which divide the area around base station 11 into 6 equal parts corresponding to above-mentioned horizontal plane directivity. In the same way, the input terminals of the reception sections of base stations 12 and 13 each are connected to 6 sector antennas 32 (32a, 32b, 32c, 32d 32e and 32f) and 33 (33a, 33b, 33c, 33d, 33e and 33f), and these sector antennas 32a, 32b, 32c, 32d, 32e, 32f, 33a, 33b, 33c, 33d, 33e and 33f each cover sector cells 42 (42a, 42b, 42c, 42d, 42e and 42f) and 43 (43a, 43b, 43c, 43d, 43e and 43f), which divide the area around the base stations 11 and 12 into 6 equal parts, respectively. Here, base stations 11, 12 and 13 are located as shown in the figure. Here, respective sector cells noted by using the same lower case alphabetic letters are arranged in the same direction centering around corresponding base stations. Also, respective sector antennas noted by using the same lower case alphabetic letters are provided in the same direction centering around corresponding base stations. For the sake of explanation, the directivity direction of sector antennas 31a, 32a and 33a is given as 0°, of sector antennas 31b, 32b and 33b, 60°, of sector antennas 31c, 32c and 33c, 120°, of sector antennas 31d, 32d and 33d, 180°, of sector antennas 31e, 32e and 33e, 240° and of sector antennas 31f, 32f and 33f, 300°. The wireless terminal 21 is located in the sector cell 41f, the wireless terminal 22 is located in the sector cell 42f, the wireless terminal 23 is located in the sector cell 43a and the wireless terminal 24 is located in the sector cell 43f. Also, this mobile communications system has one control channel used for controlling connection and three communication channels CH1 to CH3.

Figure 2:
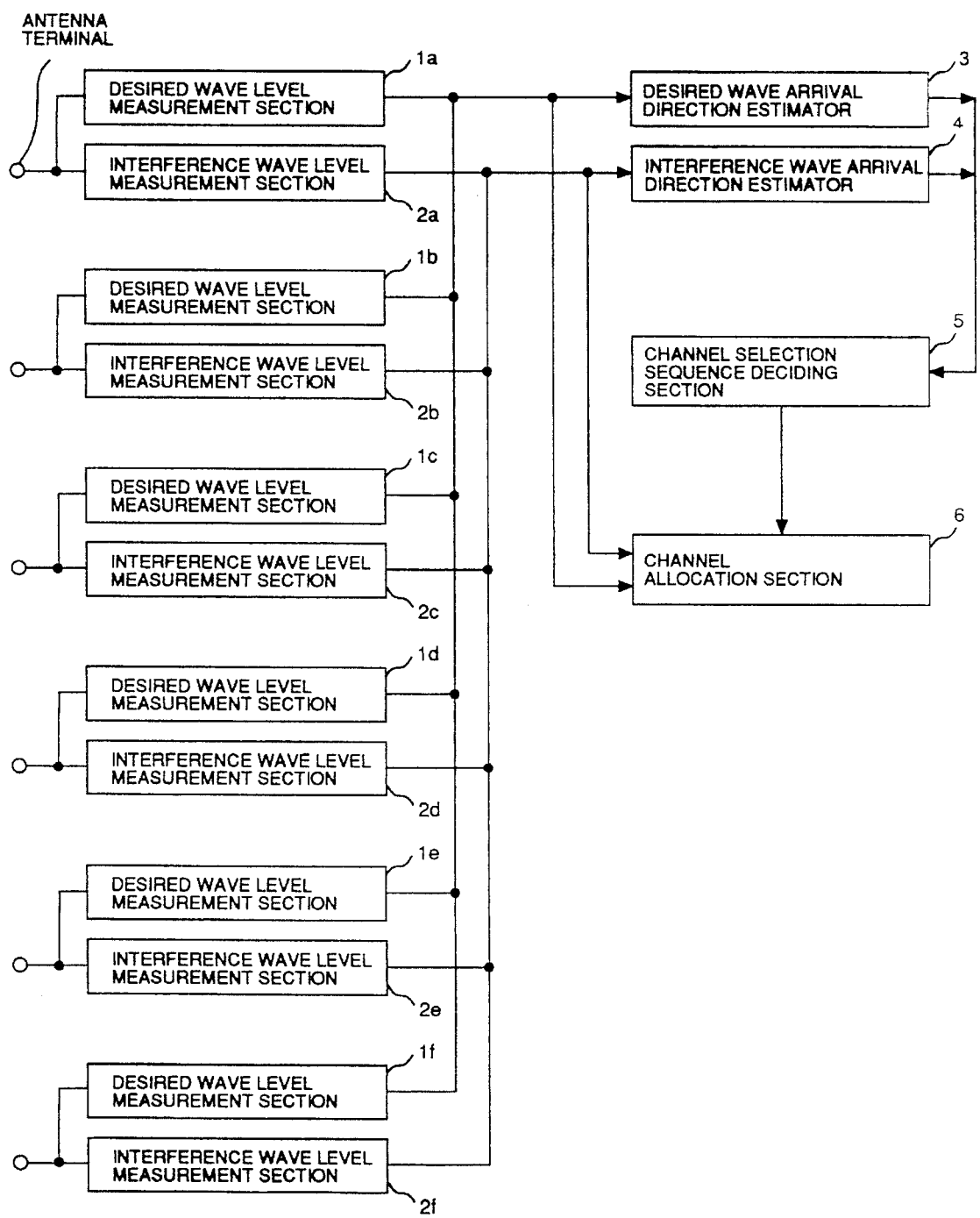
FIG. 2 is a block diagram explaining the first embodiment.

FIG. 2 is a block diagram showing an internal configuration of the base station 11. Here, explanation for the other base stations such as 11 or 12 is omitted, because the configurations of the base stations 12 and 13 are the same as that of the base station 11.

Numbers 1a to if are desired wave level measurement sections corresponding to each sector antenna. They measures a received level of a desired wave from a wireless terminal.

Numbers 2a to 2f are interference wave level measurement sections corresponding to each sector antenna. They measures a level of an interference wave of a channel used by other base stations and other wireless terminals.

Number 3 is a desired wave arrival direction estimator for receiving received levels of the desired wave level measurement sections 1a to 1f and calculating a maximum received level. Then it outputs a direction of a sector antenna corresponding to the maximum received level as an arrival direction of a desired wave.

Number 4 is an interference wave arrival direction estimator for receiving received levels of the desired wave level measurement sections 1a to 1f and calculating a maximum received level. Then it outputs a direction of a sector antenna corresponding to the maximum received level as an arrival direction of an interference wave.

Number 5 is a channel selection sequence deciding section. It receives an arrival direction of a desired wave from the desired wave arrival direction estimator 3 and an arrival direction of an interference wave from the interference wave arrival direction estimator 4, and decides communication channel selection sequence in order so as a channel of which angle difference between the arrival direction of an interference wave and the arrival direction of a desired wave is closest to 180° is first.

Number 6 is a channel allocating section. It checks communication quality in the order decided by the channel selection sequence deciding section 5, and allocates the best channel for communication with a wireless terminal.

Next, a concrete operation thereof is explained.

In the mobile communications system shown in FIG. 1, the base station 12 is using channel CH2 to communicate with wireless terminal 22. The base station 13 is using channel CH3 to communicate with the wireless terminal 23 and using channel CH1 to communicate with the wireless terminal 24. At this time, when a request for communication originates between the base station 11 and the wireless terminal 21, the wireless terminal 21 uses the control channel to transmit the signal. The base station 11 uses all sector antennas 31 connected to it to measure reception level (desired wave level) of the signal from wireless terminal 21. The base station 11, in turn, also measures interference wave levels of channels CH1, CH2 and CH3. Here, desired wave levels received by the desired wave level measurement sections 1a to 1f of the base station 11 from sector antennas 31a, 31b, 31c, 31d, 31e and 31f are given as Da, Db, Dc, Dd, De and Df. In the same way, the interference wave levels of CH1 received by the interference wave level measurement sections 2a to 2f of the base station 11 from sector antennas 31a, 31b, 31c, 31d, 31e and 31f are given as U1a, U1b, U1c, U1d, U1e and U1f, respectively, the interference wave levels of channel CH2 are given as U2a, U2b, U2c, U2d, U2e and U2f, respectively and the interference wave levels of channel CH3 are given as U3a, U3b, U3c, U3d, U3e and U3f, respectively.

Because the wireless terminal 21 is located within directivity direction of the sector antenna 31f of the base station 11, Df has the maximum value of the desired wave levels from the wireless terminal 21 among Da, Db, Dc, Dd, De and Df, which are measured by each sector antenna. It is determined by the desired wave arrival direction estimator 3 that arrival direction of the desired waves is 300°, the directivity direction of sector antenna 31f.

Because the wireless terminal 24 using channel CH1 is located within directivity direction of the sector antenna 31c, interference wave level U1c is maximum among interference wave levels U1a, U1b, U1c, U1d, U1e and U1f from the wireless terminal 24 measured by each sector antenna. It is, therefore, determined that arrival direction of channel CH1 interference wave is 120°, the directivity direction of sector antenna 31c.

In the same way, because the wireless terminal 22 using channel CH2 is located within directivity direction of the sector antenna 31d, interference wave level U2d is maximum among interference wave levels U2a, U2b, U2c, U2d, U2e and U2f from the wireless terminal 24 measured by each sector antenna. It is, therefore, determined that arrival direction of channel CH2 interference wave is 180°, the directivity direction of sector antenna 31d.

And, because the wireless terminal 23 using channel CH3 is located within directivity direction of the sector antenna 31c, interference wave level U3c is maximum among interference wave levels U3a, U3b, U3c, U3d, U3e and U3f from the wireless terminal 23 measured by each sector antenna. It is, therefore, determined that arrival direction of channel CH3 interference wave is 120°, the directivity direction of sector antenna 31c.

Next, the identifier transmitter 5 of the base station 11 determines channel selection sequence, using desired wave arrival directions and arrival directions of interference waves to channels CH1, Ch2 and CH3. The arrival directions of interference waves to channels CH1, CH2 and CH3 are 120°, 180° and 120°, respectively. Since the arrival direction of the desired wave is 300°, the differences between the angles of the arrival directions of the interference waves and the desired waves are 180°, 120° and 180°, respectively. With the present invention, channels are selected starting with those for which the difference between angles of arrival direction of interference waves and desired waves are closest to 180°. In this example, the angle differences for CH1 and CH3 are both just 180°, while for CH2 the angle differences are closer to 120° than 180°, the sequence of selection is "CH1, CH3, CH2" or "CH3, CH1, CH2". In cases where the angle differences for a channel are equal, the sequence can be decided optionally. Here, the channel selection sequence is "CH1, CH3, CH2".

Since, as described above, Df has maximum desired wave reception level at the base station 11, this base station 11 uses the sector antenna 31f to communicate with the wireless terminal 21. In accordance with the above-mentioned selection sequence, first, channel CH1 is selected, and channel interference ratio (CIR) for desired waves to this channel and the electric power of interference waves, that is, the ratio of desired wave level Df to interference wave level U1f at the sector antenna 31f, is calculated. If this exceeds a certain fixed value, the base station 11 indicates a quality evaluation on the usability (or unusability) of the channel CH1 with the wireless terminal 21. In response, the wireless terminal 21 measures the level of the interference waves to channel CH1 and calculates the ratio of desired wave level or reception level of the signal from the base station 11 to interference wave level. It also determines whether or not it exceeds a certain fixed value. Here, because the base station 13 is using channel CH1 via the sector antenna 33f, whose directivity direction includes the location of wireless terminal 21, there is a high level of interference waves to the wireless terminal 21, so channel CH1 cannot be allocated. At this time, the wireless terminal 21 notifies the base station 11 that channel CH1 cannot be used.

Next, the base station 11 selects channel CH3, and in the same way, calculates the ratio of desired wave level Df to interference wave level U3f on channel CH3. If this ratio exceeds the above-mentioned fixed value, it determines that the wireless terminal 21 cannot use channel CH3. At this time, because the base station 13 is using channel CH3 via the sector antenna 33a, whose directivity direction does not include the location of the wireless terminal 21, interference wave level to the wireless terminal 21 is small enough that channel CH3 can be used. Thus, the wireless terminal notifies the base station 11 that channel CH3 can be used, and, using channel CH3, begins communication with the base station 11.

Next, the second embodiment is explained.

In the second embodiment, a identification signal announcing channel is further provided. Here, an estimating method of an arrival direction of a desired wave when a communication request occurs between the base station 11 and the wireless terminal 21 in the movable communication system shown in FIG. 1 is explained, because the configuration of the second embodiment is the same as that of the first embodiment other than the part of estimating an arrival direction of a desired wave.

Figure 3:
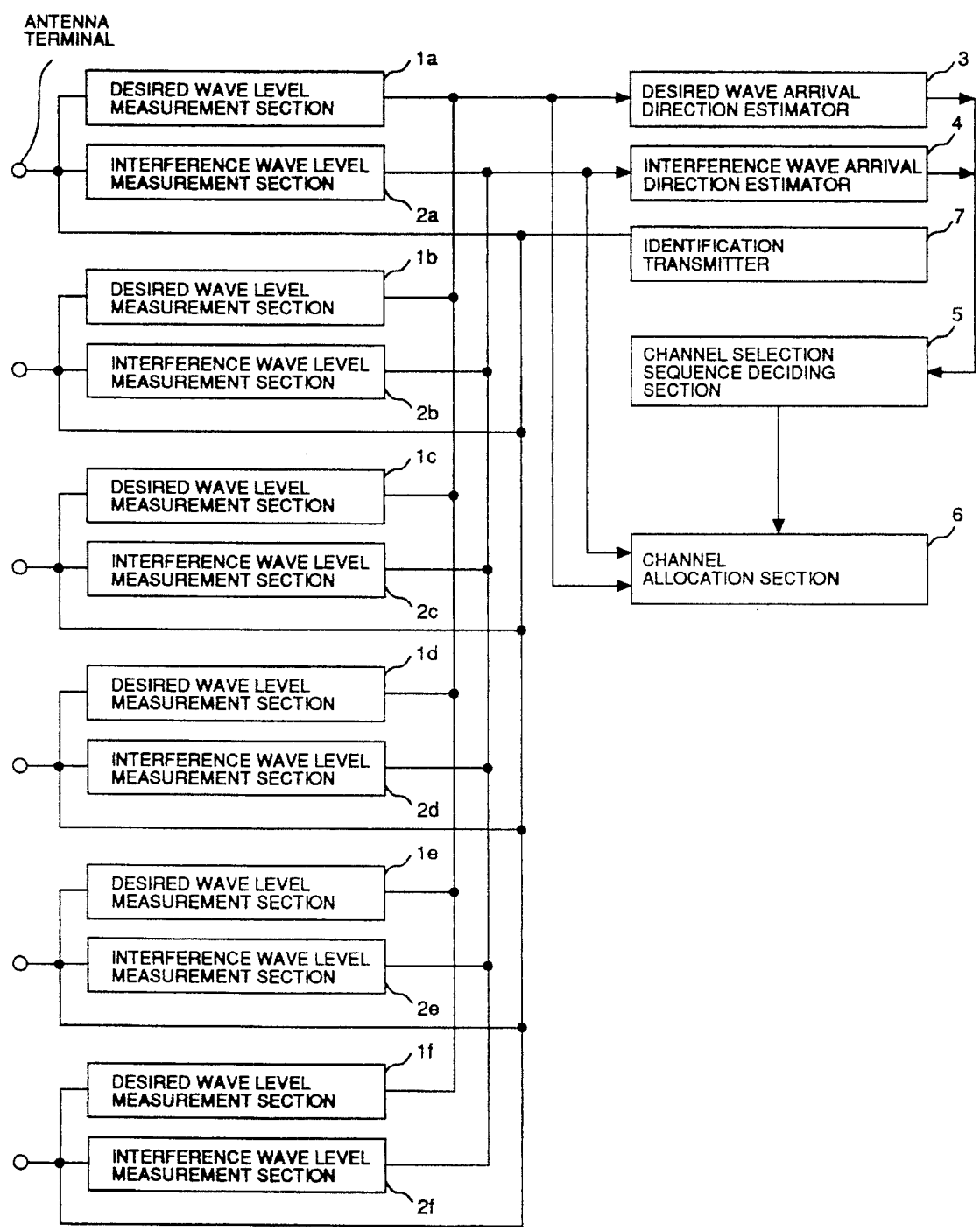
FIG. 3 is a block diagram explaining the second embodiment.

FIG. 3 is a block diagram of the base station 11 of the second embodiment.

In FIG. 3, a component having the same number as that in FIG. 2 are omitted to be explained, because its configuration is the same as that in FIG. 2.

Number 7 is a identification signal transmitter for transmitting a identification signal described later.

The following is an explanation of concrete operations of the second embodiment.

Figure 4:
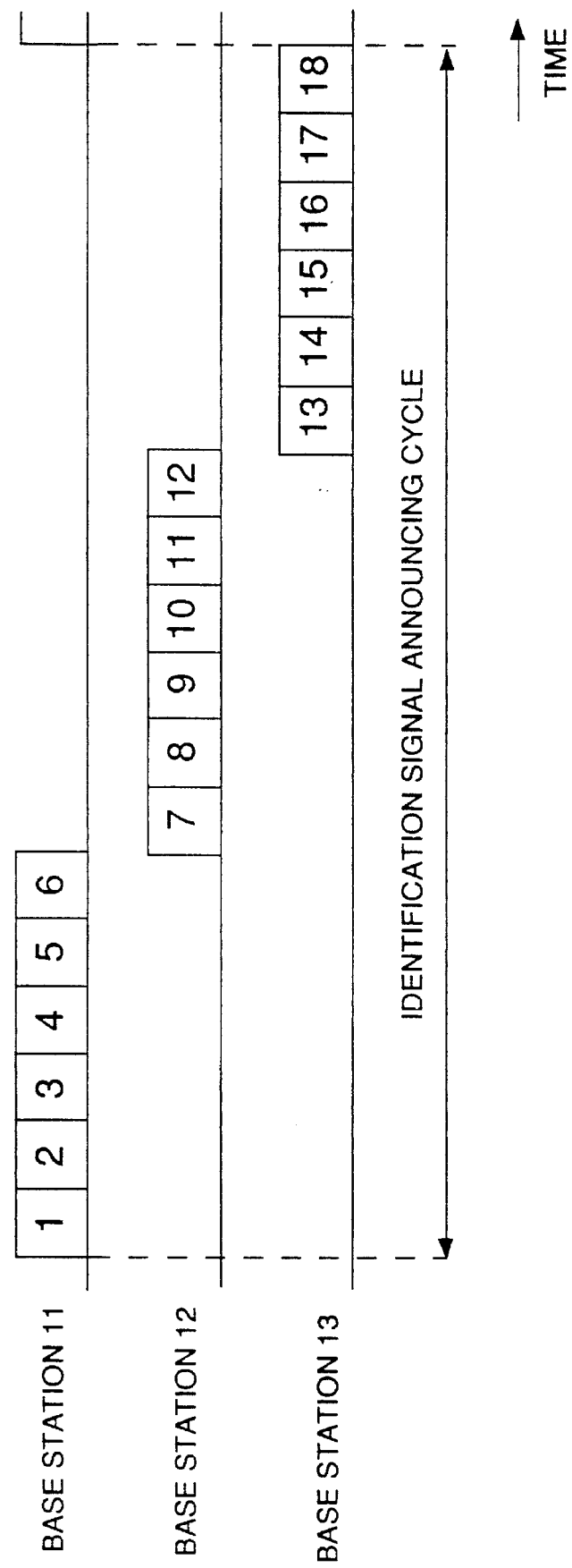
FIG. 4 is a figure for explaining operations of identification signal call in the second embodiment.
Figure 5:
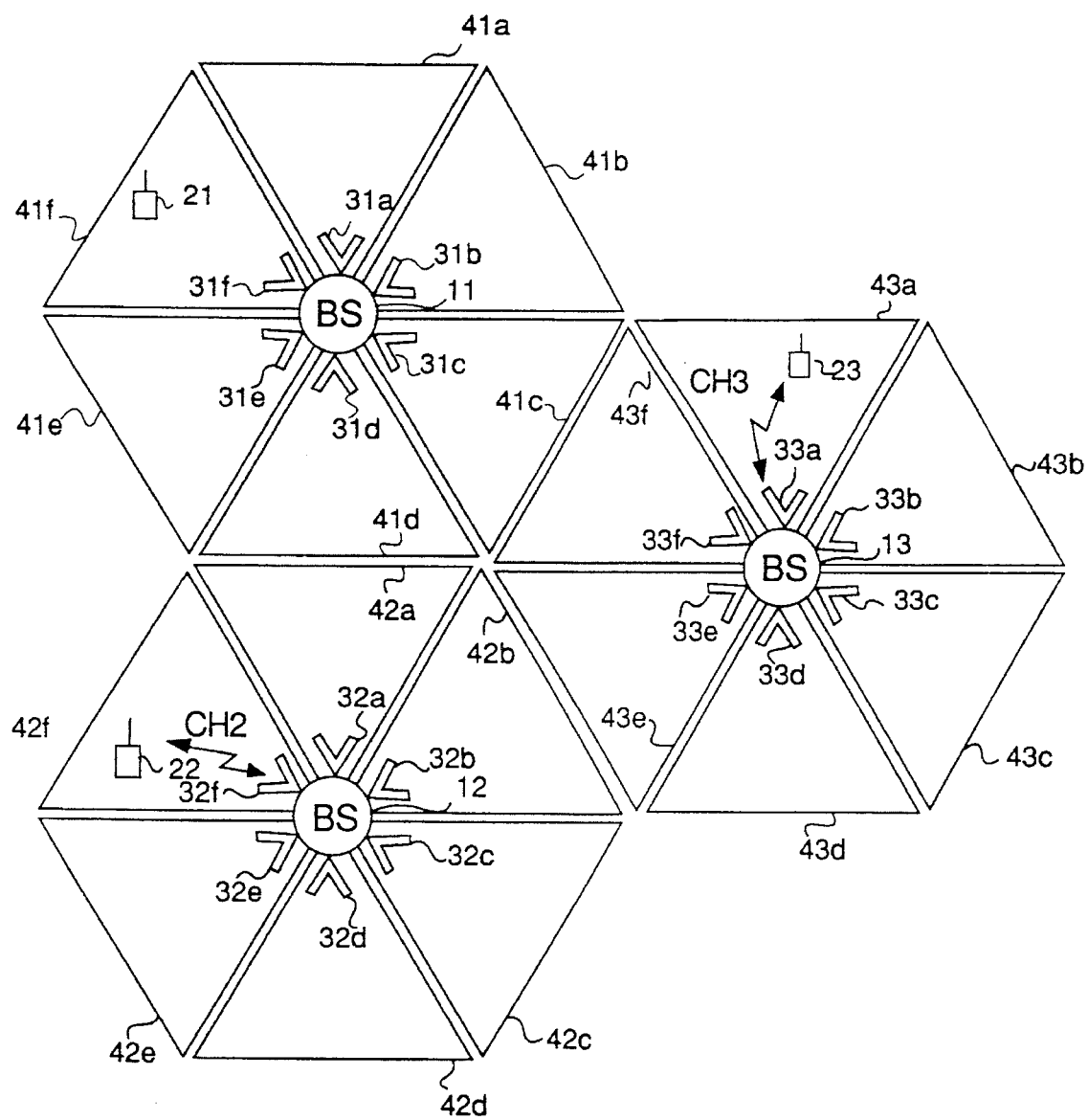
FIG. 5 is a conceptual system diagram of a prior mobile communications system.

Numbers 1 to 18 in FIG. 4 are the slot numbers for the identification signal announcing channel. The base station 11 uses slots 1 to 6 of identification signal announcing channels to report a identification signal having each identifier for each sector antenna via the sector antennas 31a, 31b, 31c, 31d, 31e and 31f. Then, the base station 12 uses slots 7–12 to report via the sector antennas 32a, 32b, 32c, 32d, 32e and 32f, and the base station 13 uses slots 13–18 to report via the sector antenna 33a, 33b, 33c, 33d, 33e and 33f their respective identification signals. When the report from the base station 13 is complete, the base station 11 again begins reporting, repeating the same cycle.

If a communication request arises between the base station 11 and the wireless terminal 21, the wireless terminal 21 receives identification signal announcing channels in order, measuring their respective levels. Here, reception levels of the reported signal are referred to as S1a, S1b, S1c, S1d, S1e and S1f, respectively received by the reception section of the wireless terminal via the sector antennas 31a, 31b, 31c, 31d, 31e and 31f. In the same way, reported signals are received via the sector antennas 32 and 33.

Because the wireless terminal 21 is located within directivity direction of the sector antenna 31f of the base station 11, reception level S1f becomes maximum of the received signals reported from the sector antenna 31f. The wireless terminal 21 reports identifier of the sector antenna 31f to the base station 11. Receiving this, the base station 11 estimates the arrival direction of the desired wave as 300°, because the directivity direction of sector antenna 31f is 300°. Following this, estimation of arrival direction of interference waves, determination of channel selection sequence, etc. are the same as in the first embodiment, their explanations are thus omitted.

As in these embodiments, giving priority to channels for selection to those for which the differences between the angles of the arrival directions of the desired waves and the interference waves to the base station gives a small difference between the angles of the arrival direction of the desired waves and interference waves to the wireless terminal.

In a mobile communications propagation environment when a wireless terminal is moved during communication, the propagation paths of radio waves are blocked by buildings, etc. between it and the base station, and because the degree of interference differs with location, reception levels of desired and interference waves vary. The biggest factor connected with this variation is buildings in the direction of the base station nearby the wireless terminal. Therefore, in cases when the arrival directions of the desired wave and interference waves are approximately the same, when desired waves are blocked by buildings, interference waves are also blocked by the same buildings, and the locational correlations of variations of level become great. In this way, the likelihood, that CIR of the downlink during communication becomes small and interference deterioration occurs, becomes small.

In the above, embodiments were used in a detailed explanation of the present invention. However, the present invention is not limited to these embodiments only. For example, in the embodiments, there are 6 sector cells to 1 base station, but there can be any number of sector cells. Also, because in the determination of arrival directions of desired and interference waves, the largest measured reception levels via the sector antennas used during communication are used, accuracy of estimation of arrival directions is determined by the number of sector cells to base stations. Accuracy of estimation can be increased by establishing other antennas top be used in estimation of arrival direction. The use of antennas for estimation of arrival direction in this way does not hinder the use of the present invention.

What is claimed is:

1. A channel allocation system for communication systems, by which a proper communication channel between a wireless terminal and a base station is allocated when a communication request has arisen between said wireless terminal and said base station to which said wireless terminal belongs, said channel allocation system for communication systems comprising:

(a) step of measuring a received level of a desired wave from said wireless terminal in each sector cell of said base station and estimating an arrival direction of said desired wave, in said base station;

(b) step of measuring a received level of an interference wave from a channel that is used by other base stations and other wireless terminals in each sector cell of said base station and estimating an arrival direction of said interference wave, in said base station; and (c) step of allocating a communication channel of which angle difference in a horizontal plane between said arrival direction of said desired wave and said arrival direction of said interference wave is closest to 180° for communication between said wireless terminal and said base station, in said base station.

2. The channel allocation system for communication systems of claim 1, wherein said (c) step further comprising:

(d) step of deciding a communication channel selection sequence in order so as a channel of which angle difference in a horizontal plane between said arrival direction of said desired wave and said arrival direction of said interference wave is closest to 180° is first; and (e) step of selecting a communication channel meeting a preset communication quality according to said selection sequence and allocating this selected channel for communication between said wireless terminal and said base station.

3. The channel allocation system for communication systems of claim 1, wherein said (a) step is a step of measuring a received level of a desired wave from said wireless terminal in each sector cell of said base station and deciding the direction of a sector antenna corresponding to a sector cell in which received level is maximum as the arrival direction of said desired wave.

4. The channel allocation system for communication systems of claim 1, wherein said (b) step is a step of measuring a received level of an interference wave from a channel used for communication between other base station and other wireless terminal in each sector cell of said base station and deciding the direction of a sector antenna corresponding to a sector cell in which received level is maximum as the interference direction of said interference wave.

5. The channel allocation system for communication systems of claim 1, comprising, instead of said (a) step:

(f) step of transmitting, from said base station, an identification signal including a sector antenna identifier corresponding to each sector cell;

(g) step of receiving said identification signal at said wireless terminal, measuring a received level of each identification signal and transmitting an identifier of an identification signal corresponding to a maximum received level; and (h) step of deciding a direction of a sector antenna corresponding to said identifier received by said base station as an arrival direction of a desired wave from said wireless terminal.

6. A channel allocation system for communication systems, by which a proper communication channel between a wireless terminal and a base station is allocated when a communication request has arisen between said wireless terminal and said base station to which said wireless terminal belongs, said channel allocation system for communication systems comprising:

(a) step of measuring a received level of a desired wave from said wireless terminal in each sector cell of said base station and deciding the direction of a sector antenna corresponding to a sector cell in which received level is maximum as the arrival direction of said desired wave;

(b) step of measuring a received level of an interference wave from a channel that is used by other base stations and other wireless terminals in each sector cell of said base station and deciding the direction of a sector antenna corresponding to a sector cell in which received level is maximum as the arrival direction of said interference wave;

(c) step of deciding a communication channel selection sequence in order so as a channel of which angle difference in a horizontal plane between said arrival direction of said desired wave and said arrival direction of said interference wave is closest to 180° is first, in said base station; and (d) step of selecting a communication channel meeting a preset communication quality according to said selection sequence and allocating this selected channel for communication between said wireless terminal and said base station.

7. A channel allocation system for communication systems, by which a proper communication channel between a wireless terminal and a base station is allocated when a communication request has arisen between said wireless terminal and said base station to which said wireless terminal belongs, said channel allocation system for communication systems comprising:

(a) step of transmitting, from said base station, an identification signal including a sector antenna identifier corresponding to each sector cell;

(b) step of receiving said identification signal at said wireless terminal, measuring a received level of each identification signal and transmitting an identifier of an identification signal corresponding to a maximum received level;

(c) step of deciding a direction of a sector antenna corresponding to said identifier received by said base station as an arrival direction of a desired wave from said wireless terminal;

(d) step of measuring a received level of an interference wave from a channel that is used by other base stations and other wireless terminals in each sector cell of said base station and deciding the direction of a sector antenna corresponding to a sector cell in which received level is maximum as the arrival direction of said interference wave;

(e) step of deciding a communication channel selection sequence in order so as a channel of which angle difference in a horizontal plane between said arrival direction of said desired wave and said arrival direction of said interference wave is closest to 180° is first, in said base station; and (f) step of selecting a communication channel meeting a preset communication quality according to said selection sequence and allocating this selected channel for communication between said wireless terminal and said base station.

8. A base station having a plurality of sector cells, each of them covering each wireless zone, comprising:

a first measuring means for measuring a received level of a desired wave from a wireless terminal in each of said sector cells when said wireless terminal has requested to communicate with said base station;

a first estimating means for estimating an arrival direction of said desired wave based on received levels of said desired wave measured in the sector cells;

a second measuring means for measuring a received level of an interference wave from a channel used for communication between other base stations and other wireless terminals in each of said sector cells;

a second estimating means for estimating an arrival direction of said interference wave based on received levels of said interference wave measured in the sector cells;

an allocating means for allocating a communication channel of which angle difference in a horizontal plane between said arrival direction of said desired wave and said arrival direction of said interference wave is closest to 180° for communication between said wireless terminal and said base station.

9. The base station of claim 8, wherein said first estimating means detects a maximum received level from among received levels of said desired wave and decides the direction of a sector cell corresponding to the detected received level as said arrival direction of said desired wave.

10. The base station of claim 8, wherein said second estimating means detects a maximum received level from among received levels of said interference wave and decides the direction of a sector cell corresponding to the detected received level as said arrival direction of said interference wave.

11. The base station of claim 8, wherein said allocating means comprises:

a deciding means for deciding a communication channel selection sequence in order so as a channel of which angle difference in a horizontal plane between said arrival direction of said desired wave and said arrival direction of said interference wave is closest to 180° is first; and an allocating means for selecting a communication channel meeting a preset communication quality according to said selection sequence and allocating this selected channel for communication between said wireless terminal and said base station.

12. A communication system for a wireless terminal and a base station, comprising:

said base station having;

a plurality of sector cells, each of them covering each wireless zone, a plurality of sector antennas corresponding to each sector cell, a transmitting means for transmitting an identification signal in which an identifier of a sector antenna is inserted to said wireless terminal, a first estimating means for receiving an identifier of said sector antenna transmitted from said wireless terminal and deciding the direction of a sector antenna of the received identifier as an arrival direction of a desired wave of said wireless terminal, a measuring means for measuring a received level of an interference wave from a channel used for communication by other base stations and other wireless terminals in each of said sector cells, a second estimating means for estimating an arrival direction of said interference wave based on the measured interference received levels, an allocating means for allocating a communication channel of which angle difference in a horizontal plane between said arrival direction of said desired wave and said arrival direction of said interference wave is closest to 180° for communication between said wireless terminal and said base station; and said wireless terminal having a transmitting means for receiving said identification signal, measuring a received level of each identification signal and transmitting an identifier of an identification signal corresponding to a maximum received level.

13. The base station of claim 12, wherein said second estimating means detects a maximum received level from among received levels of said interference wave and decides a direction of a sector antenna of a sector cell corresponding to this received level as an arrival direction of said interference wave.

* * * * *